June 28, 1932.  J. S. WENTWORTH  1,864,568
HYDRAULIC TRANSMISSION
Filed Feb. 17, 1931   5 Sheets-Sheet 1

INVENTOR.
JESSE S. WENTWORTH
BY James N. Ramsey
ATTORNEY.

INVENTOR.
JESSE S. WENTWORTH
BY James N. Ramsey
ATTORNEY.

June 28, 1932.  J. S. WENTWORTH  1,864,568
HYDRAULIC TRANSMISSION
Filed Feb. 17, 1931  5 Sheets-Sheet 4

INVENTOR.
JESSE S. WENTWORTH
BY
ATTORNEY.

June 28, 1932.  J. S. WENTWORTH  1,864,568
HYDRAULIC TRANSMISSION
Filed Feb. 17, 1931   5 Sheets-Sheet 5
Fig. 9.
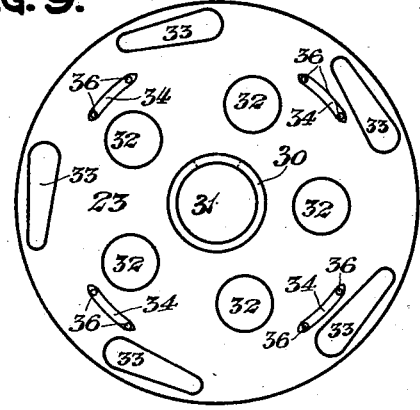
Fig. 10.
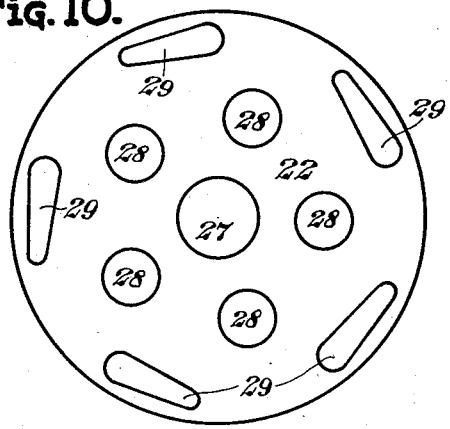
Fig. 11.
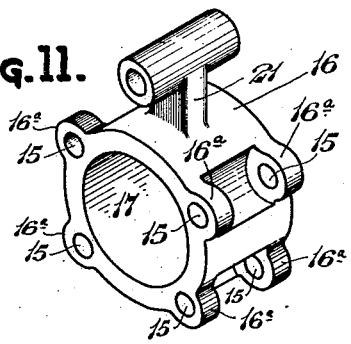
Fig. 12.
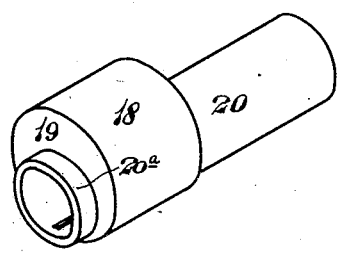
Fig. 14.
Fig. 13.
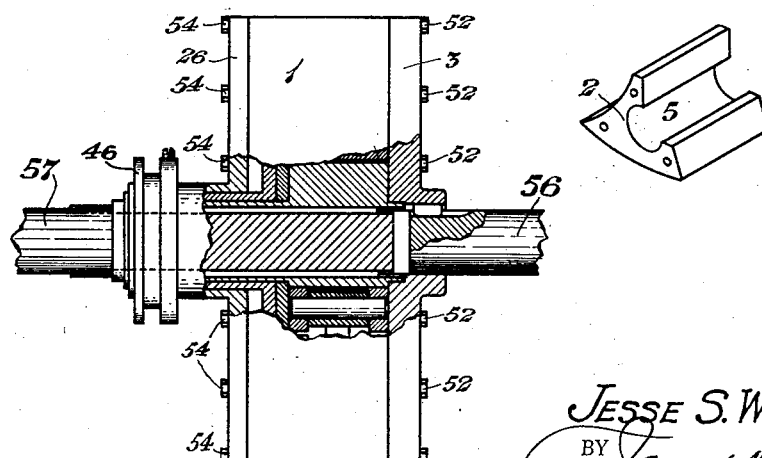
INVENTOR.
JESSE S. WENTWORTH
BY James N. Ramsey
ATTORNEY.

Patented June 28, 1932

1,864,568

UNITED STATES PATENT OFFICE

JESSE S. WENTWORTH, OF NORWOOD, OHIO, ASSIGNOR TO S-W HYDRAULIC LABORATORIES, OF HAMILTON, OHIO, A PARTNERSHIP CONSISTING OF ALEXANDER J. STEIDL AND JESSE S. WENTWORTH

HYDRAULIC TRANSMISSION

Application filed February 17, 1931. Serial No. 516,364.

This invention relates to improvements in hydraulic transmissions and the principal objects are to provide a hydraulic transmission which is simple in its construction and operation, efficient, compact and low in its constructional cost.

Another object of this invention is the provision of a hydraulic transmission having a clutch equivalent in its operation since the variable speeds developed are universal from a nil motion of the driven up to the full speed of the driver.

To the accomplishment of the foregoing and such other objects as may hereinafter appear, this invention consists in the production of a universal variable speed hydraulic transmission and clutch, in combination, adaptable wherever clutch control and variable speeds are required, reference being had to the accompanying drawings forming part hereof and shown merely for the purpose of illustrative disclosure, it being understood that various changes and modifications may be made in practice without departing from the scope or spirit of my invention as defined by the claims.

In the drawings:

Fig. 9 is a detail view of the movable port plate;

Fig. 10 is a detail view of the fixed port plate;

Fig. 11 is an isometric detail view of the eccentrically actuated ring;

Fig. 12 is an isometric detail view of the combined hollow shaft and eccentric;

Fig. 13 is an isometric detail view of one of the bellows plate bearings; and

Fig. 14 is a side elevational view similar to Fig. 1 but shown on a reduced scale, parts being broken away and parts shown in section to illustrate a modified shaft construction.

Figure 2:
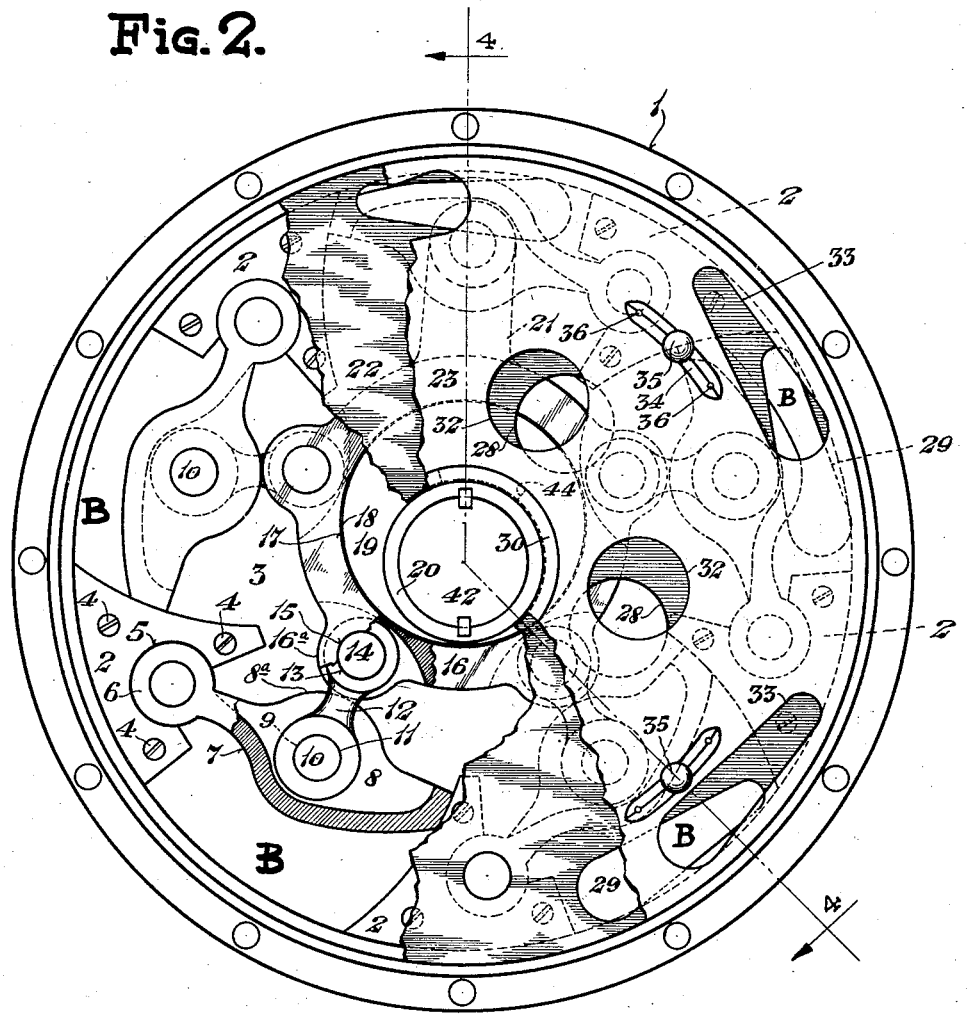
Fig. 2 is an end view of Fig. 1 looking in the direction of arrow A of said Fig. 1 with the front cover associated parts removed and the port plates partially broken away to clearly illustrate the invention.
Figure 3:
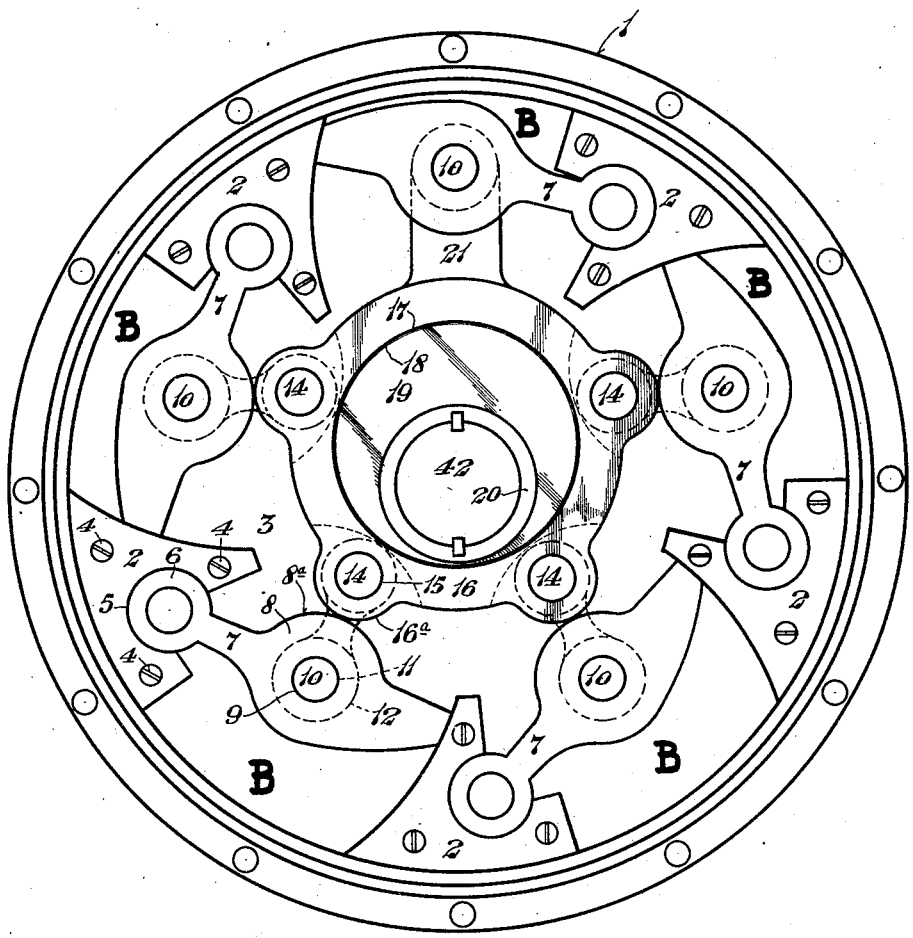
Fig. 3 is a view similar to Fig. 2 with the port plates entirely removed.
Figure 4:
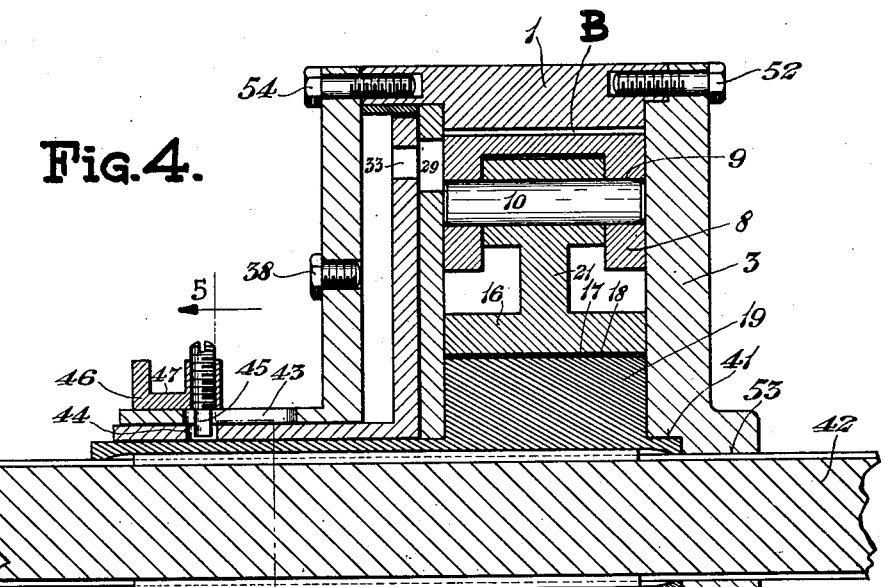
Fig. 4 is a vertical section taken on a plane corresponding to line 4—4 of Fig. 2.
Figure 5:
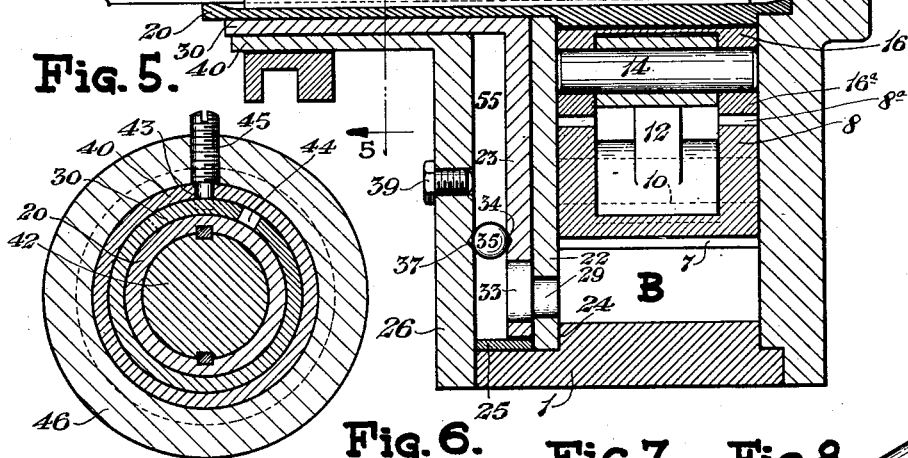
Fig. 5 is a cross section on the line 5—5 of Fig. 4, looking in the direction indicated by the arrows.

In the embodiment of my invention as illustrated and which shows a preferred construction I provide a universal variable speed hydraulic transmission and clutch comprising an outer rim 1 provided on its inner periphery with bellows plate bearings 2 equally spaced apart, as shown in Fig. 3, and secured to the rear cover 3 by bolts 4, as shown in Figs. 2 and 3. Each of these bearings 2 (a detail of one being shown in Fig. 13) is provided with an elongated socket 5 to receive the tubular end 6 of a bellows plate 7, one of the bellows plates being shown in Fig. 7. Each bellows plate 7 is further provided with oppositely disposed walls 8—8, which walls are provided with alined holes 9—9 to receive a pin 10 (Fig. 4). This pin 10 also passes through hole 11 in one end of connecting link 12. Hole 13 in the other end of connecting link 12 receives the pin 14 (Fig. 4) the ends of which pin are received by one pair of the oppositely disposed holes 15—15 in the eccentrically actuated ring 16. This ring 16 is provided with a central bore 17 (Fig. 11) of a size suitable for snugly receiving the outer periphery 18 (Fig. 12) of the eccentric portion 19 of hollow shaft 20.

Figures 7, 8:
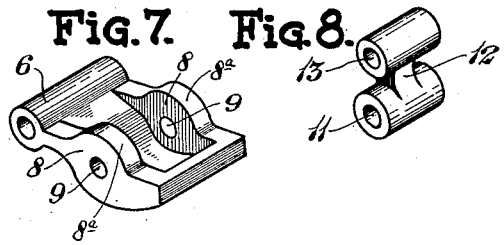
Fig. 7 is an isometric detail view of one of the bellows plates.
Fig. 8 is an isometric detail view of one of the bellows plate connecting links.

In the present showing and as clearly illustrated in Fig 2, there are five of the bellows plates 7, five of the bellows plate bearings 2 and but four pivotally mounted connecting links 12. The remaining or fifth bellows plate 7 is pivotally connected to arm 21, which arm is an integral part of the eccentrically actuated ring 16, as clearly shown in Fig. 3 and in detail in Fig. 11. The edge portions 8a of the walls 8 of the bellows plates 7 are curved, as shown in Fig. 7, and are adapted to have a rubbing contact with the edges 16a of eccentrically actuated ring 16, as clearly shown in Fig. 2, for purposes to be described as the description proceeds.

Referring next to the port plates, the inner port plate designated 22, a detail of which is shown in Fig. 10, is of slightly larger diameter than the outer port plate 23, shown in Fig. 9. The inner port plate 22 is held against the shoulder 24 of outer rim 1 by sleeve 25 and the front cover 26 by bolts 54, as clearly shown in Fig. 4. This inner port plate 22 is provided with a central bore 27 and with concentrically arranged circular openings 28 and concentrically arranged oblong ports 29. The outer port plate 23 is provided with an integrally formed hub 30 which is provided with a central bore 31, the diameter of which is the same as the central bore 27 of inner port plate 22. The outer port plate 23 is also provided with concentrically arranged circular openings 32 and concentrically arranged oblong ports 33 and with grooved recesses 34, the latter to receive the balls 35, as shown in Figs. 2 and 4, respectively. Stop pins 36 are mounted in the ends of each grooved recess 34 to limit the movement of the balls 35 within said recesses. The interior face of the front cover 26 is provided with grooved recesses 37 similar to the recesses 34 in the outer port plate 23 so that the balls 35, located between the outer port plate 23 and the front cover 26 ride in said recesses 34 and 37, respectively, to reduce to a minimum the friction in moving said outer port plate 23, as will be presently described. The front cover 26 is further provided with a filler plug 38 and an airvent plug 39, as shown in Fig. 4 and with a hub 40 which is bored out to receive the hub 30 of outer port plate 23, the central bore 31 of the latter receiving the hollow shaft 20 of eccentric portion 19. End 20a of hollow shaft 20 if journaled within the socket 41 in rear cover 3. In Fig. 4, 42 represents a shaft which is splined within the hollow shaft 20 and is adapted to be movable endwise within said shaft 20.

Figure 1:
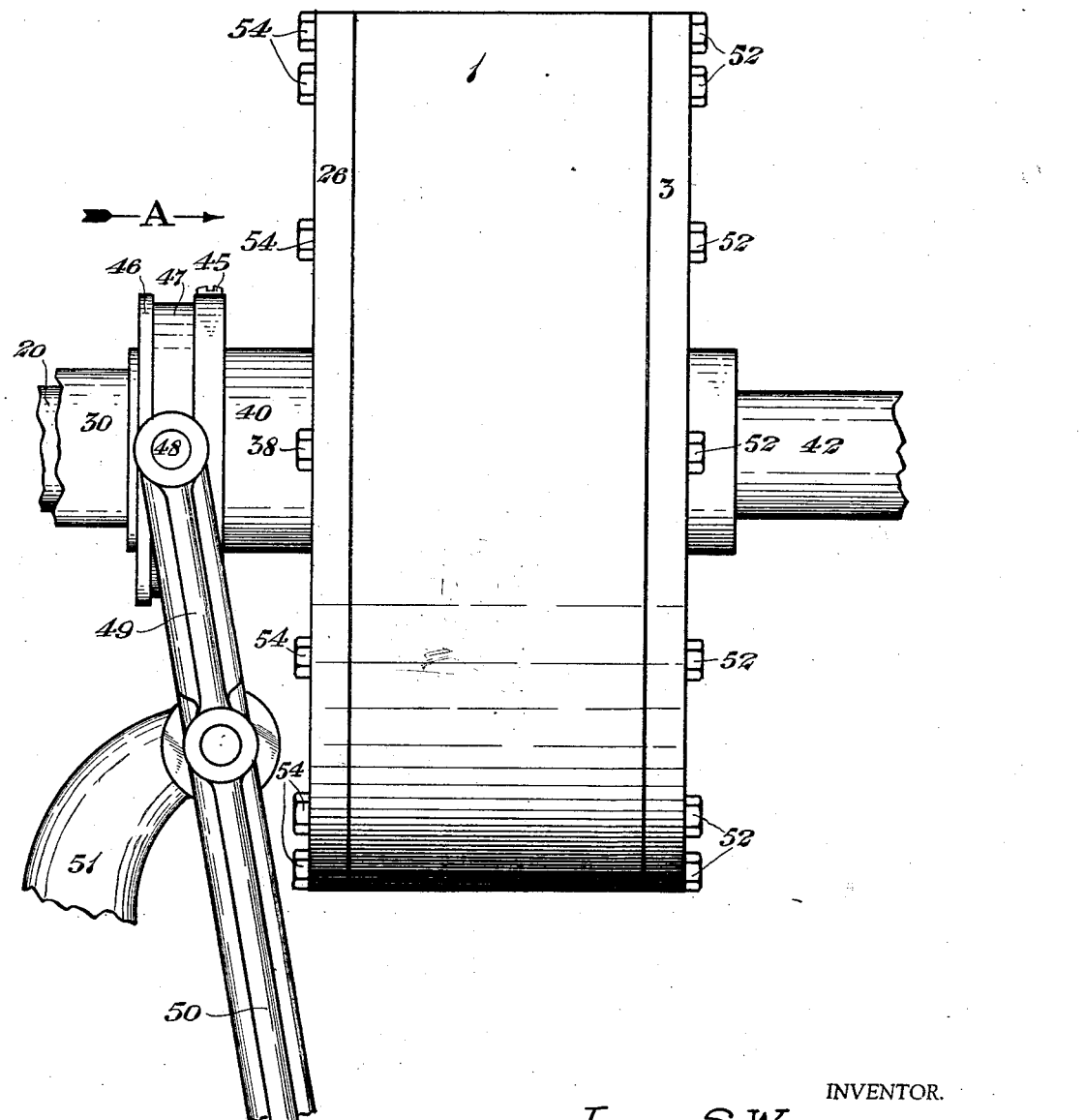
Fig. 1 is a side elevational view of a variable speed hydraulic transmission and clutch embodying the principles of the present invention.
Figure 6:
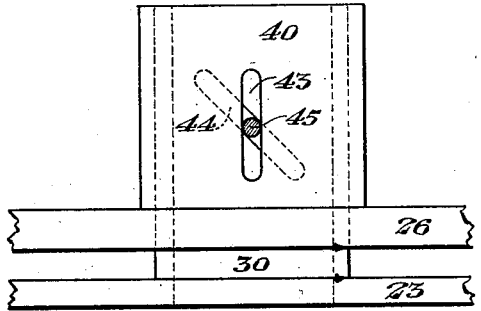
Fig. 6 is a fragmentary view showing the hub and a portion of the front cover and the hub and a portion of the movable port plate to illustrate the port plate actuating stud slots.

Hub 40 of front cover 26 is provided with an elongated slot 43, as shown in Fig. 6, and hub 30, of outer port plate 23, is provided with an angular slot 44, the said slots 43 and 44 combinedly receiving the inner end of actuating pin 45, which pin is carried by the sliding collar 46, as clearly shown in Fig. 4. This collar 46 is provided with an annular groove 47, which receives the nibs 48 carried by the forked end 49 of shifting lever 50, said lever being pivoted to a suitable bracket 51, as shown in Fig. 1.

In assembling the transmission shown in Fig. 4, and starting with the outer rim 1, the rear cover 3 is securely fixed to said rim 1 by bolts 52; then the bellows plate bearings 2 are rigidly attached to said rear cover 3 by the bolts 4, as indicated in Fig. 3. Then the shaft 42 is passed through the bore 53 in rear cover 3, whereupon the hollow shaft 20 is inserted upon the shaft 42 and moved endwise on said shaft until the end 20a of hollow shaft 20 rests within the socket 41 in the rear cover 3, as indicated in Fig. 4.

The next step is to pivotally connect one end of each connecting link 12 to the eccentrically actuated ring 16 by the pins 14, the other end of said links being pivotally attached between the walls 8—8 of the bellows plates 7 by the pins 10. The eccentrically actuated ring 16, having the connecting links 12 and the bellows plate 7 attached thereto, is then inserted within the outer rim 1 in such a manner that the central bore 17 of said ring 16 is received over the outer periphery 18 of eccentric portion 19 and the tubular ends 6 of the bellows plates 7 being received within the elongated sockets 5 in the bellows plate bearings 2. Then the central bore 27 of inner port plate 22 is passed over the hollow shaft 20 and said plate coming to rest against the shoulder 24 of the outer rim 1, as shown in Fig. 4. Then the outer port plate 23 is inserted over the hollow shaft 20 and the sleeve 25 inserted over the outer periphery of said outer port plate 23 and coming to rest against the inner port plate 22. The inner port plate 22 is arranged in such a manner that the ports 29 are spaced between the bellows plate bearings 2, as shown in Fig. 2 and directly opposite the compression chambers B, which chambers are formed by the outer rim 1, rear cover 3, bellows plates 7 and inner port plate 22, respectively. Then the balls 35 are placed within the grooved recesses 34 of outer port plate 23 and the front cover 26 inserted over the hub 30 of outer port plate 23 so that the grooved recesses 37 receive the balls 35, whereupon said front cover 26 is securely fixed to the outer rim 1 by bolts 54. The sliding collar 46 is then passed upon the hub 40 of front cover 26 and the actuating pin 45 screwed therein, as shown, so that its inner end simultaneously engages the elongated slot 43 and the angular slot 44 of the hubs 40 and 30, respectively. The transmission is then turned so that the rear cover 3 is in a horizontal position and the filler plug 38 and the air-vent plug 39 are removed therefrom. The interior or all available space within the unit is then filled with a liquid, preferably an oily liquid, and the filler plug 38 and the air-vent plug 39 replaced within the front cover 26, as shown in Fig. 4.

In operation the transmission functions in the following manner:

Assuming that shaft 42 is to be the driven member and that outer rim 1 is the driving member, said shaft 42 will be at rest when the outer rim 1 is revolving, provided that the ports 29 and 33 of the port plates 22 and 23 are fully open—that is, in registry with one another. This being true, the eccentrically actuated ring 16 is revolved upon the outer periphery 18 of the eccentric portion 19 and the bellows plates 7 are moved in a fanlike motion towards and from the inner periphery of the outer rim 1. This movement of the bellows plates 7 forces the liquid out of the compression chambers B, successively, through the ports 29 and 33, respectively, and into the liquid chamber 55, said liquid passing from said chamber 55 through the openings 28 an 32, respectively, so as to be disposed behind said plates. Then assume that the shifting lever 50 is moved to slide the sliding collar 46 upon the hub 40, the actuating pin 45, working within the angular slot 44, in hub 30 of outer port plate 23, will move said outer port plate, thus gradually closing the ports, as shown in Fig. 2, and gradually trapping the liquid between the bellows plates 7 and the inner periphery of the outer rim 1, or, to be more exact, within the compression chambers B. When the port plate 23 is moved so that the ports 29 and 33 are fully closed or out of registry with one another the liquid is trapped between the bellows plates and the inner periphery of the outer rim or within the chambers B, thus stopping the movement of said plates which, in turn, (through the eccentrically actuated ring 16 and eccentric portion 19) causes the shaft 42 to be rotated at a speed equal to that of said outer rim 1 as the latter is splined to the hollow shaft 20 said shaft, in turn, being an integral part of the eccentric portion 19. With this arrangement the speed of the shaft 42 is variable from nothing up to the speed of the outer rim 1 by gradually trapping the liquid within the chambers B which is accomplished by the closing and opening of the ports in said plates 22 and 23. In the event the unit shown in Fig. 4 is used for purposes of operating the spindle of a drilling machine, the outer periphery of the rim 1 can be belt driven and the shaft 42 utilized as the spindle for the drill, it being practical to slide said spindle or shaft 42 endwise within the unit. A modification of this unit, however, is shown in Fig. 14 and assuming that shaft 56 is the driving shaft and shaft 57 the driven shaft any speed from zero up to the full speed of the driving shaft 56 may be imparted to the driven shaft 57 by the operation of the port plate 23, as previously described. The balls 35 are placed between the outer port plate 23 and the front cover 26 to eliminate any friction and allow a smooth and easy movement of the port plate 23 by the actuating pin 45 and the sliding collar 46.

While I have shown and described one particular embodiment of my invention it is to be understood that certain changes and modifications can be made without departing from the scope or spirit thereof as defined in the claims.

What I claim as new and desire to secure by Letters Patent is:

1. A combined hydraulic transmission and clutch comprising an outer rim, covers therefor, said rim and covers constituting a cylindrical housing, a driven shaft passing through the mean center of said housing, a hollow shaft received over said driven shaft and fixed for rotation with the latter, an eccentric formed upon said hollow shaft, an inner port plate held in fixed relation relative to said rim, an outer port plate located adjacent said inner port plate, a liquid chamber located between said outer port plate and one of said covers, ports in each of said plates, means for closing and opening said ports, an eccentric ring mounted upon said eccentric, a plurality of bellows plates pivotally mounted in spaced apart relation adjacent the inner periphery of said rim and links pivotally connecting the bellows plates with said eccentric ring, respectively, whereby when said ports are fully opened said driven shaft is at rest when said housing is in motion and whereby when said ports are fully closed said driven shaft is driven at the same speed as said housing, substantially as set forth and for the purposes specified.

2. A combined hydraulic transmission and clutch comprising a cylindrical housing, a driven shaft slidably passing through said housing and means entirely enclosed within said housing for imparting variable speeds therefrom to said driven shaft comprising a hollow shaft rotatably mounted within said housing and fixed for rotation with said driven shaft, a port plate fixed for movement with said housing, an eccentric fixed upon said hollow shaft having a width exactly that of the distance between said fixed port plate and said housing, an eccentric ring mounted upon said eccentric, a plurality of bellows plates pivotally mounted within said housing, means pivotally connecting said plates with said eccentric ring, a plurality of compression chambers, a movable port plate mounted adjacent said fixed port plate, a liquid chamber located between said movable port plate and said housing, a plurality of ports in said fixed port plate located adjacent the said compression chambers, respectively, a plurality of ports in said movable port plate, and means for moving said movable port plate so as to bring its ports into or out of registry with the ports in the fixed port plate, and a liquid contained within said housing and adapted to fill all cavities therein, substantially as set forth and for the purposes specified.

3. In combination, a combined hydraulic transmission and clutch comprising an outer rim, covers fixed thereto, said rim and covers constituting a cylindrical housing, a drive shaft fixed to one of said covers, a driven shaft, a hollow shaft received over said driven shaft and fixed for rotation with the latter, means for rotatably supporting said hollow shaft within said housing, an eccentric portion formed integral with said hollow shaft, a port plate fixed for rotation with said housing, a movable port plate mounted adjacent said fixed port plate, an eccentric ring mounted upon said eccentric, a plurality of pivotally mounted bellows plates, a plurality of bearings for said plates mounted in spaced apart relation and adjacent the inner periphery of said rim, a plurality of compression chambers formed between said bellows plates, bearings and housing, respectively, means connecting said bellows plates with said eccentric ring whereby they are moved in a fan-like motion towards and from the inner periphery of the rim, a plurality of ports in said fixed port plate located in the vicinity of the compression chambers, respectively, a plurality of ports in said movable port plate, auxiliary openings in said port plates, means for moving said movable port plate so as to move its ports and auxiliary openings into and out of registry with the ports and auxiliary openings in the fixed port plate, respectively, and a liquid carried within said housing to fill all of the cavities contained therein.

4. A hydraulic transmission and clutch of the class described comprising a drum housing, a spindle shaft slidably passing therethrough and means entirely enclosed within said housing for imparting variable speeds from said housing to said spindle shaft comprising a hollow shaft splined to said spindle shaft, an eccentric portion formed integrally with said hollow shaft, an eccentrically actuated ring received over said eccentric, a plurality of bellows plates, a plurality of bellows plate bearings, a plurality of links pivotally connecting said bellows plates with said eccentrically actuated ring, means on said ring adapted to have a rubbing action against a curved portion on each bellows plate, respectively, a fixed port plate, a movable port plate, a plurality of ports in each of said plates, the ports in said fixed port plate being adjacent a plurality of compression chambers, respectively, a liquid chamber located between said movable port plate and said housing, means for moving said movable port plate to bring its ports into and out of registry with the ports in said fixed port plate and bearing means located between said movable port plate and said housing, substantially as set forth and for the purposes specified.

5. A hydraulic transmission and clutch of the class described comprising the combination of a spindle shaft, circular covers disposed upon said shaft, a circular rim disposed between said covers, a plurality of bellows plates mounted for movement towards and from the inner periphery of said rim, a plurality of bellows plate bearings each having a curved surface disposed adjacent the free end of the adjacent bellows plate, a plurality of liquid compression chambers defined by the bellows plates, bellows plate bearings, circular covers and circular rim, respectively, a hollow shaft splined to said spindle shaft, an eccentric portion fixed relative to said hollow shaft, an eccentrically actuated ring received over said eccentric and having pivotal connection with the bellows plates, respectively, a port plate fixed relative to said housing, a plurality of ports in said plate located adjacent said compression chambers, a movable port plate mounted adjacent said fixed port plate and having a plurality of ports in said last-mentioned plate, a plurality of bearings mounted between said movable port plate and one of said circular covers, a liquid chamber between said last two mentioned members and means for moving said movable port plate relative to said fixed port plate so as to bring its ports into and out of registry with the ports in said fixed port plate whereby when all of the available space within said housing is filled with a liquid variable speeds can be imparted to the spindle shaft from said housing by gradually trapping or releasing said liquid within said compression chambers by the movement of said movable port plate, substantially as set forth and for the purposes specified.

JESSE S. WENTWORTH.